Patented Aug. 30, 1932

1,875,281

UNITED STATES PATENT OFFICE

ELEK von 'SIGMOND, OF BUDAPEST, HUNGARY

COMPOSITION FOR NEUTRALIZING ALKALINE SOIL AND METHOD OF PREPARING SAME

No Drawing. Application filed February 12, 1930, Serial No. 427,996, and in Hungary March 21, 1929.

My invention refers to products adapted for use in agriculture and more especially to strewable products containing sulfate ions.

The incorporation of sulfuric acid in the soil is old. Almost thirty years ago sulfuric acid was first recommended for the conservation of solid and liquid manure, and alkaline soils were acted upon with iron vitriol sulfate solutions. In some cases sulfuric acid itself was used.

In practical use free sulfuric acid is not suitable for the following reasons:

The handling and dilution of concentrated sulfuric acid are connected with considerable danger and the distribution of dilute sulfuric acid on the soil requires acid-proof sprinkling apparatus.

For these reasons sulfuric acid has been replaced by other acids, for instance hydrochloric acid or acetic acid, or the soil was neutralized with solutions of iron sulfate or aluminium sulfate, care being taken to select neutralizing agents of higher efficiency than the crude gypsum which had been recommended before. Now the use of acids other than sulfuric acid is preferable only in view of the dilution with water; in all other respects no advantage is derived from their use and the costs are considerably higher.

It therefore appears preferable to use iron sulfate and aluminium sulfate, which are far more efficient than gypsum for the following reasons:

If gypsum is scattered on an alkaline soil the following reactions will take place:

1. $Na_2CO_3 + CaSO_4 \rightleftarrows CaCO_3 + Na_2SO_4$

2. $T_m Na_n + \frac{n}{2} CaSO_4 \rightleftarrows T_m Ca_{\frac{n}{2}} + \frac{n}{2} Na_2SO_4$ In these formulæ $T_m$ is the absorption complex of the soil. Recent investigations on alkaline soils have shown that not only the alkali salts ($NaCl$, $Na_2SO_4$, $Na_2CO_3$) are responsible for the deterioration of the soil, but that the absorption complex itself contains more or less sodium kations absorbed, which render the soil impervious when wet, and hard, when dry. Fortunately the absorbed sodium can easily be replaced by some neutral salt, such as for instance $CaSO_4$, according the second of the two equations. As a rule the alkaline soils containing $Na_2CO_3$ are rich in $CaCO_3$, but the latter is insoluble owing to the presence of $Na_2CO_3$. The Ca-kation in $CaCO_3$ can be rendered soluble by the addition of sulfuric acid or aluminium sulfate and/or iron sulfate. If sulphuric acid is used the following reactions will take place:

1. $Na_2CO_3 + H_2SO_4 \rightleftarrows Na_2SO_4 + CO_2 + H_2O$
2. $CaCO_3 + H_2SO_4 \rightleftarrows CaSO_4 + CO_2 + H_2O$
3. $Na_2CO_3 + CO_2 + H_2O \rightleftarrows 2NaHCO_3$
4. $CaCO_3 + CO_2 + H_2O \rightleftarrows Ca(HCO_3)_2$ 5. $T_m Na_n + \frac{n}{2} CaSO_4 \rightleftarrows T_m Ca_{\frac{n}{2}} + \frac{n}{2} Na_2SO_4$ 6. $T_m Na_n + \frac{n}{2} Ca(HCO_3)_2 \rightleftarrows T_m Ca_{\frac{n}{2}} + nNaHCO_3$ In comparing these two groups of reactions it will be seen that the free sulfate ion is more efficient than the sulfate ion in the form of gypsum and therefore smaller quantities of sulfate ions in the form of sulfuric acid are needed to improve alkaline soils than in the form of gypsum. In this case one can still further reduce the quantity of sulfate ions, for the process occurring in the soil is a process of coagulaton, to which mere stoicheiometric principles do not apply. In view thereof the quantity of sulfate ions required for the improvement if applied in the form of sulfuric acid may cost less than in the form of gypsum, although in other respects the sulfate ion in the form of sulfuric acid is more expensive.

Practical tests have shown that it is possible to obtain the same effect with one fifth of the equivalent quantity of sulfuric acid as compared with gypsum. This fact will be understood, if it is considered, that the above reactions merely denote the final conditions. It is however well known that for instance $Na_2CO_3 + H_2SO_4 \rightleftarrows NaHCO_3 + NaHSO_4$ results in an acid reaction and further quantities of $Na_2CO_3$ can be bound as follows:

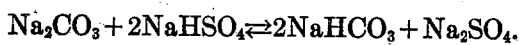
$$Na_2CO_3 + 2NaHSO_4 \rightleftharpoons 2NaHCO_3 + Na_2SO_4.$$

It is further known that free sulfuric acid will increase the hydrogen ion concentration of the soil solution of a sudden, whereby the colloid dispersion of the soil is reduced and coagulation takes place.

When using aluminium sulfate the following reactions take place.

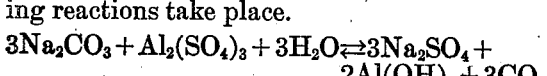
$$3Na_2CO_3 + Al_2(SO_4)_3 + 3H_2O \rightleftharpoons 3Na_2SO_4 + 2Al(OH)_3 + 3CO_2$$

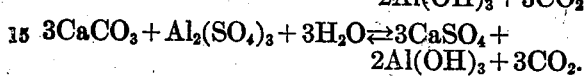
$$3CaCO_3 + Al_2(SO_4)_3 + 3H_2O \rightleftharpoons 3CaSO_4 + 2Al(OH)_3 + 3CO_2.$$

The further reactions correspond to those taking place when using free sulfuric acid.

As regards the iron sulfate, similar reactions may occur as in the case of aluminium sulfate, though ferrous carbonate is not as little stable as the theoretical aluminium carbonate.

Now iron sulfate and aluminium sulfate as at present obtainable are too expensive to be suitable for practical use.

I have now found that earthy (i. e. amorphous or non-crystalline) minerals including decomposed ores which contain a high amount of free aluminium oxide accompanied by oxides of iron, such as for instance bauxite, can easily be converted by means of concentrated sulfuric acid into a product, which has proved to be suitable for replacing the liquid sulfuric acid not only in its use on alkaline soils, but also in the conservation of stable manure or in its use as a weed-killer. This product is nothing but a substitute for the liquid sulfuric acid in a grindable and strewable form. It is neither a manure or fertilizer nor does it produce $CO_2$, because the carbonates, if present in the raw material, or added to it in order to produce gypsum and dry out the product, if this is desired, will be decomposed altogether by the sulfuric acid, $CaSO_4$ being formed. Nor is the product identical with simple mixtures of aluminium sulfate, ferrous or ferric sulfates and gypsum, as evidenced by the chemical characteristics defined further below of the new products.

As a rule I prefer using as much sulfuric acid as is required to convert all the bases present into the corresponding sulfates, but it is not my intention to extract from the bauxite or the like part or all of the Al or Fe, in the form of sulfates, nor to obtain substantially neutral salts of these kations, which can be formed by well known processes. The acidity of the product can be ascertained by titration, using phenolphthalein as indicator. I have found that the products of this process contain at least 30–35% $SO_4$-ions titrable in this way. As it is probable that at the relatively low temperature the reaction with Al and/or Fe is not complete, it is very likely that some acid sulfates or physical adsorption compounds are formed, which are responsible for the high activity of the $SO_4$-ions. The true formula of these chemical compounds has not yet been ascertained.

If the raw material is too wet or the sulfuric acid not sufficiently concentrated to directly obtain a dry product, I prefer, instead of drying or concentrating the raw materials, to induce a chemical reaction by which water will be bound. I may for instance add to the raw material a sufficient quantity of $CaCO_3$ or burnt gypsum, the crystalline gypsum produced in this manner, by consuming the undesirable water under the form of crystal water, being instrumental in producing an altogether dry product. I may however also simply mix the raw materials or the wet product with the above-named materials.

In this manner I have succeeded in producing from bauxite and similar earthy materials dry products having the following sulfate ion concentration:

| Total $SO_4$ | 53% | 47,5% | 43,5% | 40,5% |
|---|---|---|---|---|
| $SO_4$ bound to Ca | 32% | 21% | 12,3% | 5,5% |

When using burnt (calcined) calcium sulfate as a drying medium, the following sulfate ion concentrations are obtained:

| Total $SO_4$ | 56,5% | 51,5% | 43,5% |
|---|---|---|---|
| $SO_4$ bound Ca | 18% | 12,2% | 5,8% |

The above shows that the use of calcium sulfate as a drying medium increases the sulfate ion concentration bound to calcium. However as this sulfate ion is less valuable than the sulfate ion combined with aluminium and iron, I prefer binding the water of reaction by converting the aluminium oxide and iron oxide into sulfates by treatment with gaseous $SO_3$. In this manner products are obtained which are altogether free from calcium sulfate and had a sulfate ion concentration of 50%. In any case the reaction must be started by the moisture contained in the earthy material.

I may also carry out the reaction in such manner that for instance one part by weight coarse grained ground bauxite is quickly mixed with one part by weight fuming sulfuric acid containing 5–10% $SO_3$.

The product thus obtained can be ground after the lapse of an hour and a dry, readily strewable powder is obtained, which when distributed on the soil has the same effect as free sulfuric acid.

In order to increase latent quantities of sulfate ions these products can be mixed in different proportions with crude sulfur ores or with ground sulfur. In the soil the added sulfur is converted by oxidation into sulfuric acid and will neutralize the soil. The alkaline soil being impermeable to air is soon coagulated by the sulfate ions in the mixture and is thereby rendered pervious to air, whereby the oxidation of the sulfur is greatly accelerated. The formation of free sulfuric acid causes a further dissolution of the calcium sulfate present in the soil, which means a further coagulation of the disperse colloids, a still better aeration of the soil, etc.

The combined effect of sulfur and the new acid product will sometimes be more valuable than the well known but relatively slow effect of sulfur alone and may eliminate the drawbacks occasioned by the rash action of sulfuric acid, if used by itself.

The products described above, when applied under the form of fine powders, have proved particularly suitable for destroying weeds, such as for instance hedge mustard and wild mustard. For this purpose the finely ground product is strewed onto the fresh seed either by hand or by means of atomizers and, if possible, when dew has settled on the plants.

The same products can also be used with great advantage for the preservation of solid and liquid manure.

Various changes may be made in the details disclosed in the foregoing specification without departing from the invention or sacrificing the advantages thereof.

I claim:—

1. As a new composition of matter adapted for agricultural purposes a mixture of sulfates of aluminium, iron and calcium and free sulfur having the form of a dry readily strewable substance.

2. The method of producing a composition of matter adapted for agricultural purposes, comprising acting on an amorphous mineral containing a high percentage of free oxides of aluminium and iron with the quantity of concentrated sulfuric acid which is required to convert the mineral directly into a product containing at least 30% sulfate ions, calcium carbonate being added to the reaction mixture to bind the water present therein.

3. The method of producing a composition of matter adapted for agricultural purposes, comprising acting on an amorphous mineral containing a high percentage of free oxides of aluminium and iron with the quantity of concentrated sulfuric acid which is required to convert the mineral directly into a product containing at least 30% sulfate ions, a drying agent and sulfur being added to the reaction mixture to bind the water present therein.

4. The method of producing a composition of matter adapted for agricultural purposes, comprising acting on an amorphous mineral containing a high percentage of free oxides of aluminium and iron with the quantity of concentrated sulfuric acid which is required to convert the mineral directly into a dry strewable product and mixing the product thus obtained with manure.

In testimony whereof I affix my signature.

ELEK von 'SIGMOND.